Patented May 10, 1949

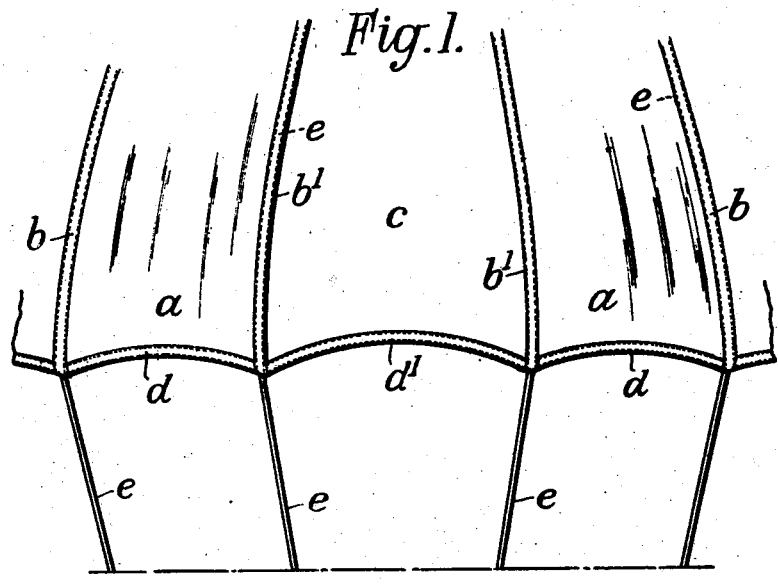
Fig. 1.
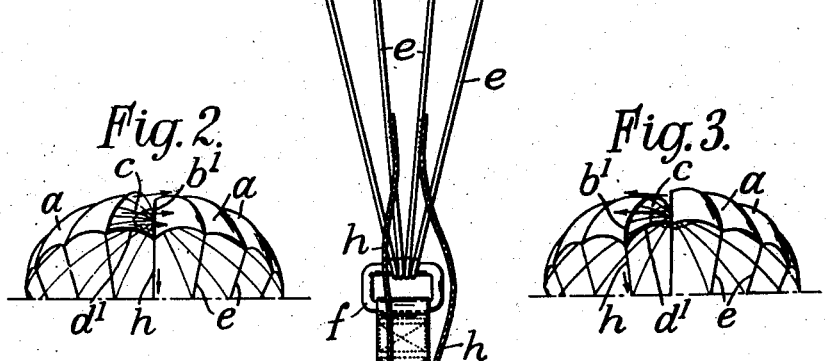
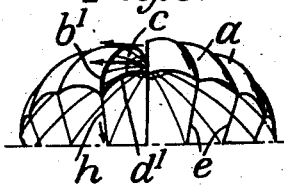
Fig. 3.
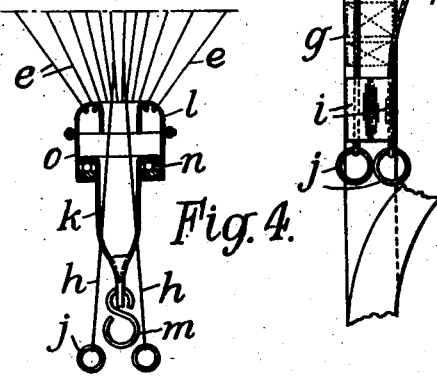
Fig. 2.
Fig. 4.
Inventor
John Raymond Cuthbert Quilter
by: John Graham
HIS AGENT.

2,469,573

UNITED STATES PATENT OFFICE 2,469,573

PARACHUTE

John Raymond Cuthbert Quilter, Woking, England

Application May 8, 1946, Serial No. 668,287
In Great Britain May 3, 1945

3 Claims. (Cl. 244—152)

This invention has reference to parachutes and more particularly to means for controlling and steering them during descent.

In my prior Patent No. 2,392,946, issued January 15, 1946, I have described a parachute canopy formed by a plurality of gores of substantially equal dimensions, the number of said gores being one less than the number required to cover the area of said canopy, and continuous bands forming the peripheral and apical zones of said canopy.

The present invention has for its main object the provision of means whereby the parachutist is enabled to take controlling and steering action so that he can cause the canopy to rotate during the descent and can at the same time impart a substantial horizontal component to the velocity of fall, particularly when nearing the ground, as for example in order to avoid an obstacle or danger.

As applied to the parachute canopy described in my aforesaid patent, the invention has for its object to provide means for partially straightening the free edge of either of the extreme gores, which normally curve or belly out due to the enclosed air during the descent of the parachute.

Another object of the invention is to provide manual means, normally within reach of the parachutist, whereby he can control and steer the parachute with greater facility and effect than by the customary transfer of weight to one or other of the lift webs.

Other objects and advantages of the invention will hereinafter appear from the following description of a preferred embodiment and a modification thereof, given with reference to the accompanying drawings, in which:

Fig. 1 is a partial view of a parachute canopy in deployed condition, as seen from the inside of the canopy and looking in the direction towards which the parachutist is facing.

Figs. 2 and 3 are oblique views, as seen from below, showing the deflected flows of air through the gap produced by pulling down each of the shroud lines connected to the opposite sides of the air-escape gap in the canopy.

Fig. 4 is a detail of a modified arrangement of the controlling lines.

The parachute canopy represented in Fig. 1 is composed of substantially triangular gores $a$ seamed together radially of the canopy at their adjacent edges $b$, but leaving in the canopy when deployed a gap $c$ of substantially triangular shape between two of the gores $a$, which bulge out under pressure of the enclosed air. The lower ends of the gores are seamed to binding strips $d$, and a similar connecting strip $d^1$ extends across the lower end of the gap $c$. The shroud lines $e$ extend from the apex of the canopy, down the seamed radial edges $b$ of the gores, including the edges $b^1$ on either side of the gap, and are attached to the junction points of the strips $d$, $d^1$, all around the canopy; from these points, the lines hang down and are connected to the swivels or buckles $f$ of the harness lift webs $g$, only one of which is shown.

During a normal descent, the air enclosed in the canopy escapes beneath the lower edges of the gores and also radially through the gap $c$.

The controllable means for straightening the edges of the gap $c$ take the form of short lines $h$ extending upwardly from within reach of the descending parachutist's hands to the two shroud lines $e$ which pass up through the seams $b^1$ bordering the air-escape gap $c$ between two gores $a$ of the canopy. These hand-operated lines $h$ may be attached to the two shroud lines $e$ about 8 to 10 inches above the swivel or buckle device $f$ which connects the lower ends of the shroud lines with the harness and they are preferably passed under housings or through tunnels $i$ supported upon a lift web $g$ connected to the respective buckle $f$.

By pulling upon one or other of these hand-lines $h$, the shroud line $e$ to which it is attached can be tensioned until it causes the seamed edge $b^1$ of the gap to be partially straightened, that is to say made less curved or bulging, and also moved inwardly towards the center of the canopy; Figs. 2 and 3 show the movement produced by pulling upon the respective hand lines $h$. In each case, the result will be that the air escaping from the canopy forms a jet passing from the still bulging side of the gap $c$ across the exterior of the straightened gap-seam $b^1$. This sideways deflection of the air-jet causes the canopy to rotate in the direction of the still bulging side $b^1$ of the gap. The air-jet, instead of proceeding radially outwards from the canopy through the gap, as in the normal condition, will then proceed approximately in a tangential direction, thereby not only rotating the canopy in the opposite direction due to the reaction, but causing it to be displaced at slow speed in a substantially horizontal direction.

The hand-lines $h$ are shown provided with rings $j$, made for example of metal and of sufficient diameter to admit two fingers of the hand, the rings being preferably of different colour (for example red and green respectively) or of different shape, so that they may be readily distinguished when the parachutist wishes to operate either one.

As shown in Fig. 4, the hand-operated lines $h$ may be passed along and through the tubular stem $k$ of a swivel device $l$ having a hook $m$ secured to the lower end of said tubular stem for the attachment of the harness, and the stem being mounted on ball bearings $n$ carried by a flange or holder member $o$ of the swivel device.

What I claim is:

1. A parachute including a canopy composed of substantially equal triangular gores, seams connecting said gores together at their edges, and a continuous band forming the peripheral zone of said canopy, the number of said gores being one less than the number required to cover the area of said canopy so as to leave in the canopy when deployed a gap of substantially triangular shape between two of said gores, means for supporting a parachutist, shroud lines connecting the peripheral zone of said canopy to said supporting means, and selective means for increasing the tension in either of said gore-edge seams adjacent to the gap, said selective means being operable by the parachutist.

2. A parachute including a canopy composed of substantially equal triangular gores, seams connecting said gores together at their edges, and a continuous band forming the peripheral zone of said canopy, the number of said gores being one less than the number required to cover the area of said canopy so as to leave in the canopy when deployed a gap of substantially triangular shape between two of said gores, shroud lines attached to the peripheral zone of said canopy in line with the seams between said gores, two other shroud lines attached to said peripheral zone in line with the gore-edge seams adjacent to the gap, lift webs attached to the lower ends of all of said shroud lines, and selective means carried by said lift webs for tensioning either of said two other shroud lines, said selective means being operable by the parachutist.

3. A parachute including a canopy composed of a plurality of sector-shaped panels leaving a gap of approximately triangular shape adjacent to the periphery of said canopy, a continuous band forming the peripheral zone of said canopy, shroud lines attached to said peripheral zone, and adjacent two of said shroud lines connecting with the base of the triangular gap in said canopy and extending upwards along opposite sides of said gap, lift webs connected to the lower ends of said shroud lines, and selective means carried by one of said lift webs for tensioning either of said two adjacent shroud lines and thereby straightening the respective side of said gap, said selective means being operable by the parachutist.

JOHN RAYMOND CUTHBERT QUILTER.

REFERENCES CITED

The following references are of record in the file of this patent:

UNITED STATES PATENTS

| Number | Name | Date |
|---|---|---|
| 2,114,301 | Harrigan | Apr. 19, 1938 |
| 2,117,319 | Hart | May 17, 1938 |
| 2,356,169 | Manson | Aug. 22, 1944 |
| 2,384,416 | Derry | Sept. 4, 1945 |
| 2,392,946 | Quilter | Jan. 15, 1946 |
| 2,398,795 | Manson | Apr. 23, 1946 |